United States Patent [19]
Okazaki et al.

[11] Patent Number: 5,763,981
[45] Date of Patent: Jun. 9, 1998

[54] VIBRATION ACTUATOR

[75] Inventors: Mitsuhiro Okazaki, Kawasaki; Isao Sugaya, Yokohama; Takatoshi Ashizawa, Kawasaki, all of Japan

[73] Assignee: Nikon Corporation, Tokyo, Japan

[21] Appl. No.: 715,366

[22] Filed: Sep. 12, 1996

[30] Foreign Application Priority Data

Sep. 20, 1995 [JP] Japan ................................ 7-241623
Jun. 14, 1996 [JP] Japan ................................ 8-154236

[51] Int. Cl.$^6$ ........................................ H02N 2/00
[52] U.S. Cl. ........................ 310/325; 310/323; 310/317
[58] Field of Search ............................ 310/17, 28, 15, 310/317, 321, 323, 325, 348, 354

[56] References Cited

U.S. PATENT DOCUMENTS 4,965,482  10/1990  Ohnishi et al. ........................ 310/323
5,306,980  4/1994   Montgomery ........................... 310/333

FOREIGN PATENT DOCUMENTS 0 674 350   9/1995   European Pat. Off. .
0 696 072   2/1996   European Pat. Off. .
2-184274    7/1990   Japan .

*Primary Examiner*—Steven L. Stephan
*Assistant Examiner*—Judson H. Jones
*Attorney, Agent, or Firm*—Shapiro and Shapiro

[57] ABSTRACT

A vibration actuator comprises a rod-shaped vibration element including an elastic unit having plural elastic members and an electromechanical converting device with portions mounted between mutually adjacent ones of the elastic members and adapted to generate mutually different plural vibrations and a relative movement member contacting an end face of the vibration element and adapted to effect a movement relative to the vibration element. The vibration element is so formed that the cross section thereof perpendicular to the axis thereof varies along the axis.

14 Claims, 13 Drawing Sheets

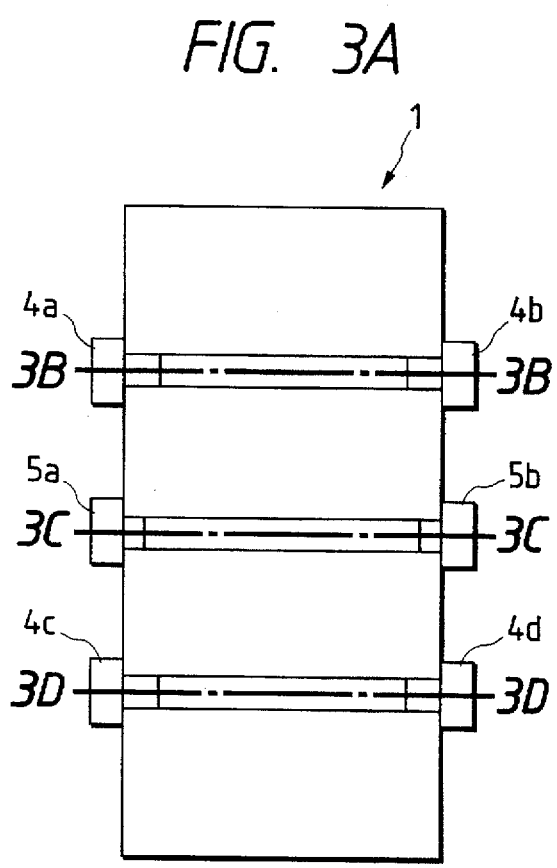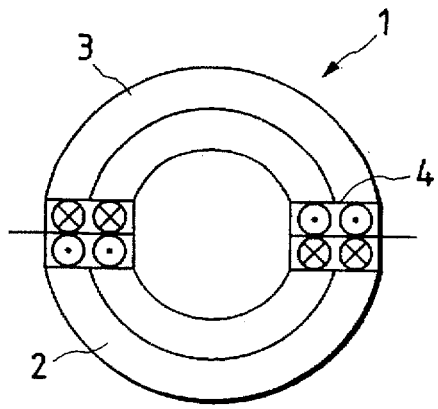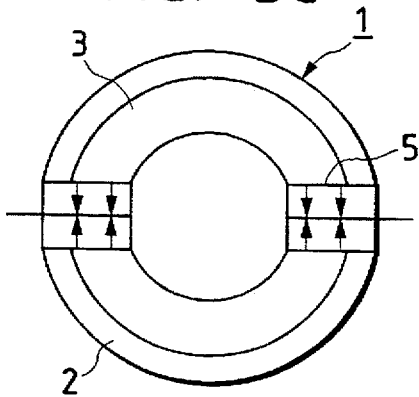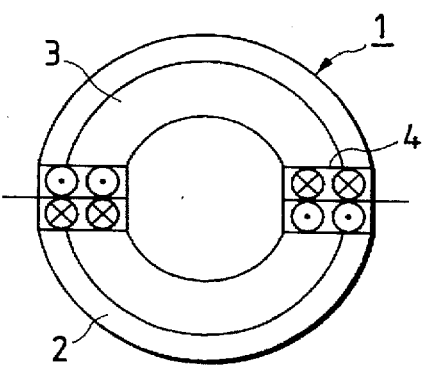

VIBRATION ACTUATOR

BACKGROUND OF THE INVENTION

1. Field of the Invention

The present invention relates to a vibration actuator which generates a driving force by generating plural vibrations in an elastic member.

2. Related Background Art

FIG. 18 is a perspective view of a conventional vibration actuator utilizing longitudinal and torsional vibrations.

In this vibration actuator, a stator 101 is composed of two cylindrical vibration elements 102, 103, a piezoelectric element 104 for torsional vibration sandwiched therebetween and a piezoelectric element 105 for longitudinal vibration positioned on the vibration element 103. The piezoelectric element 104 for torsional vibration is polarized in the circumferential direction, while the piezoelectric element 105 for longitudinal vibration is polarized in the vertical direction. A relative movement member (rotor) 106 for effecting a movement relative to the stator 101 is positioned above the piezoelectric element 105 for the longitudinal vibration.

The vibration elements 102, 103 and the piezoelectric elements 104, 105 constituting the stator 101 are fixed to a shaft 107, by screwing onto a screw portion thereof. The rotor 106 is provided rotatably on the shaft 107, by means of a ball bearing 108 at the center. At the end of the shaft 107 there is screwed a nut 110, maintaining the rotor 106 in pressure contact with the stator 101 by means of a spring 109.

The piezoelectric element 105 for the longitudinal vibration receives a drive signal from a generator 111, while the piezoelectric element 104 for the torsional vibration receives a drive signal, obtained from the output of the generator 111 by a phase shift through a phase shifter 112. Consequently the drive signal supplied to the piezoelectric element 104 and that supplied to the piezoelectric element 105 are mutually same in frequency but different in phase.

The piezoelectric element 104 for the torsional vibration provides a mechanical displacement for rotating the rotor 106, while the piezoelectric element 105 for the longitudinal vibration periodically varies the frictional force between the stator 101 and the rotor 106 in synchronization with the period of the torsional vibration generated by the piezoelectric element 104, thereby converting the vibration into a movement in a direction.

FIG. 19 is an exploded perspective view of the stator of the conventional vibration actuator.

As the piezoelectric element 104 for the torsional vibration has to be polarized in the circumferential direction, the piezoelectric material is divided into 6 to 8 sector-shaped pieces as shown in FIG. 19, which are individually polarized and then assembled again into an annular shape. There is provided an electrode 104a thereon.

However, in the conventional vibration actuator shown in FIGS. 18 and 19, it has been difficult to obtain sufficient precision in shape, in assembling the piezoelectric element 104 for the torsional vibration into the annular shape. For this reason, the mutual contact between the piezoelectric element 104 and the vibration element 103 or between the piezoelectric elements 104 is hindered. As a result, the vibration of the piezoelectric elements 104, 105 cannot be sufficiently transmitted to the vibration elements 102, 103, whereby the performance of the vibration actuator is deteriorated.

Also the piezoelectric element 104 for the torsional vibration, being assembled by adhering sector-shaped pieces, requires a thickness of at least several millimeters in order to obtain a sufficient adhesion strength. For this reason the distance between the electrodes of the piezoelectric element 104 becomes large, thus requiring a high voltage in order to provide the piezoelectric element 104 with an electric field necessary for driving.

On the other hand, the area of the piezoelectric element 104 for the torsional vibration and that of the piezoelectric element 105 for the longitudinal vibration is approximately equal to or smaller than the cross section of the vibration element 102 or 103. Also, for passing the shaft 107, the piezoelectric element 104 for the torsional vibration and that of the piezoelectric element 105 for the longitudinal vibration have to be provided with a hole at the center. Consequently the area of each of the piezoelectric element 104 for the torsional vibration and that of the piezoelectric element 105 for the longitudinal vibration becomes even smaller, so that it has been difficult to obtain a higher torque and a higher revolution in the actuator.

Also in such a conventional vibration actuator, for improving the performance thereof, the resonance frequencies of the torsional and longitudinal vibrations are made approximately equal by adjusting the length and the material of the vibration elements 102, 103 and the pressure of the rotor 106, but such adjustment has been quite difficult in practice. For example the adjustment by the length or the material of the vibration elements 102, 103 results in a variation in the resonance frequency not only of the torsional vibration but also of the longitudinal vibration. Also in case of the adjustment by the pressure of the rotor 106, the resonance frequency becomes shifted for example by a change in the load of the rotor 106 or by fatigue of the pressurizing spring.

SUMMARY OF THE INVENTION

In consideration of the foregoing, the object of the present invention is to provide a vibration actuator which can be driven with a high torque and a high revolution, which enables easy manufacture and of which the resonance frequencies of the longitudinal and torsional vibrations can be easily made mutually same.

According to an embodiment of the present invention, there is provided a vibration actuator provided with a rod-shaped vibration element including an elastic unit having plural rod-shaped elastic members and an electromechanical converting device having portions positioned between mutually adjacent elastic members and that is adapted to receive a drive signal to generate mutually different plural vibrations in the elastic unit, and a relative movement member maintained in contact with an end face of the vibration element and adapted to effect a movement relative to the vibration element, wherein the vibration element is so formed that the cross section thereof perpendicular to the axis varies along the axis.

The above-mentioned plural vibrations can be a torsional vibration around the axis of the vibration element and a longitudinal vibration along the axis of the vibration element, and the resonance frequencies of the torsional vibration and the longitudinal vibration generated in the vibration element can be mutually made approximately same.

Also the vibration element may assume a cylindrical shape including a smaller diameter portion in at least one location.

It is also possible to adopt a first order longitudinal vibration and a second order torsional vibration and to provide the smaller diameter portion in three locations in total, corresponding to a node of the longitudinal vibration and two nodes of the torsional vibration.

It is also possible to adopt a first order longitudinal vibration and a second order torsional vibration and to provide the smaller diameter portion in one location, corresponding to a node of the longitudinal vibration.

It is also possible to adopt a first order longitudinal vibration and a second order torsional vibration and to provide the smaller diameter portion in two locations, corresponding to two nodes of the torsional vibration.

It is also possible to adopt a second order longitudinal vibration and a third order torsional vibration and to provide the smaller diameter portion in five locations in total, corresponding to two nodes of the longitudinal vibration and three nodes of the torsional vibration.

Also the vibration element may be so constructed that a position where the cross section perpendicular to the axis is maximum is different from the node of the longitudinal vibration.

Also the vibration element may be so constructed that a position where the cross section perpendicular to the axis is maximum is different from the node of the torsional vibration.

Also at least one of the plural vibrations may be a first vibration generating plural antinodes and at least a node in the elastic unit, and the elastic unit may be so constructed that, among plural portions thereof divided by the immediately neighboring antinode and node of the first vibration, a portion including the end face in contact with the relative movement member has an inertial mass smaller than the average inertial mass of the remaining portions. In such case, the elastic unit may be provided with a groove, formed in a direction crossing the axis of the vibration element, around a position closer to the above-mentioned end face than the node of the first vibration.

Also the elastic unit may have different specific gravities in the elastic material constituting a portion including the above-mentioned end face and in the elastic material constituting the remaining portions.

Also the elastic unit may assume a structure in which an inertial mass member is attached to a portion including the above-mentioned end face or to the remaining portions.

Also the inertial mass member mentioned above may be a bolt unit mounted on the elastic member and/or a nut member screwed on the above-mentioned bolt member.

According to the present invention, since the vibration element is so formed that the cross section thereof perpendicular to the axis varies along the axis, there may be varied the rigidity to the vibration generated in the vibration element. It is therefore rendered possible to vary the resonance frequency for each vibration, and to have an approximately same resonance frequency for the plural vibration generated in the vibration element. Furthermore it is rendered possible to provide a vibration actuator of a high torque and a high revolution.

Also by selecting at least one of the plural vibrations as a first vibration which generates plural antinodes and at least a node in the elastic unit and by constructing the elastic unit in such a manner that, among plural portions thereof divided respectively by immediately neighboring antinode and node of the first vibration, a portion including an end face in contact with the relative movement member has an inertial mass smaller than the average inertial mass of the remaining portions, it is possible to increase the vibrational displacement at the driving face of the vibration element, thereby providing a vibration actuator of an even higher revolution and an even higher torque.

BRIEF DESCRIPTION OF THE DRAWINGS

FIG. 3A is a lateral view of the vibration element of the first embodiment;

FIGS. 3B, 3C and 3D are cross-sectional views respectively along lines 3B—3B, 3C—3C and 3D—3D in FIG. 3A;

FIGS. 13A and 13B are views showing the configuration of the vibration element in a sixth embodiment of the present invention, wherein FIG. 13A is a lateral cross-sectional view along a plane passing the center line, and FIG. 13B provides cross-sectional views respectively along lines A—A, B—B and C—C in FIG. 13A together with the state of application of the drive signal;

DETAILED DESCRIPTION OF THE PREFERRED EMBODIMENTS

[First embodiment]

Now the present invention will be clarified in detail by preferred embodiments thereof shown in the attached drawings. The vibration actuators described in the following embodiments are ultrasonic actuators utilizing the vibration of ultrasonic range.

Figure 1:
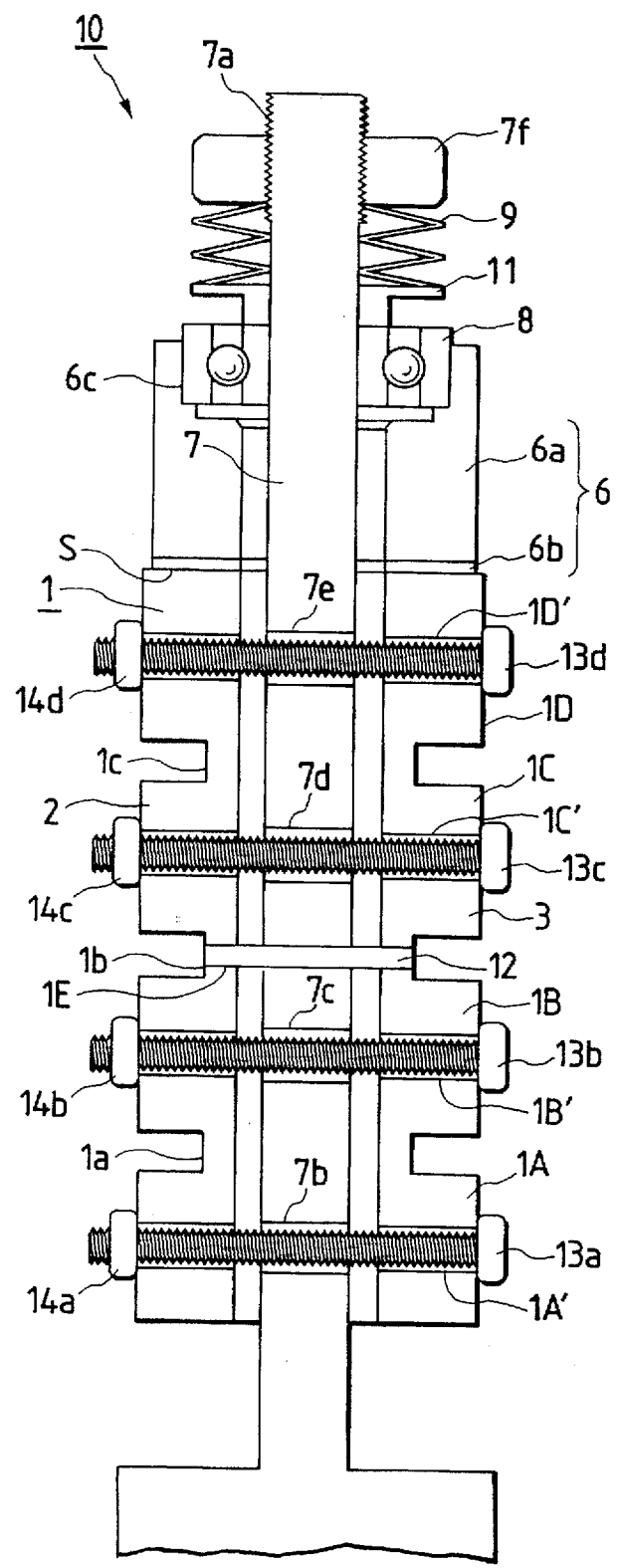
FIG. 1 is a cross-sectional view showing a first embodiment of the vibration actuator of the present invention.

FIG. 1 is a cross-sectional view of a first embodiment of such ultrasonic actuator of the present invention.

The ultrasonic actuator 10 of the present embodiment obtains a driving force by generating longitudinal and torsional vibrations in a vibration element 1. The ultrasonic actuator 10 is provided with a fixed shaft 7, a cylindrical vibration element 1 supported by the shaft 7, and a rotor 6 constituting a relative movement member. The vibration element 1 and the rotor 6 are maintained in mutual contact, in a mutually pressurized state.

The shaft 7 in the present embodiment is a cylindrical member, having a circular cross section in a direction perpendicular to the axis. The shaft 7 is provided, at an end thereof, with a screw portion 7a, and is fixed at the other end to a fixed plane by suitable means. The shaft 7 is further provided with bolt holes 7b to 7e, perpendicularly to the longitudinal direction of the shaft 7, for passing bolts 13a to 13d to be explained later.

The vibration element 1 in the present embodiment is composed of elastic members 2, 3 constituting an elastic unit, piezoelectric elements 4 constituting first electromechanical converting elements and supported in a sandwiched state between the elastic members 2, 3, and a piezoelectric element 5 constituting a second electromechanical converting element.

The elastic members 2, 3 have such a form as obtained by longitudinally dividing a hollow cylindrical elastic unit, and are desirably composed of a metallic material with low vibration attenuation such as stainless steel, invar or aluminum alloy, but may also be composed of a resinous material.

Figure 2A:
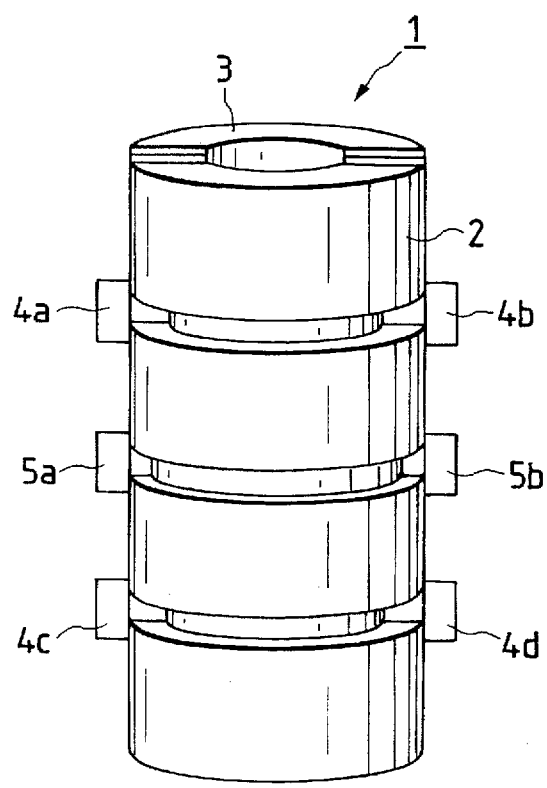
FIGS. 2A and 2B are perspective views of a vibration element of the first embodiment.
Figure 2B:
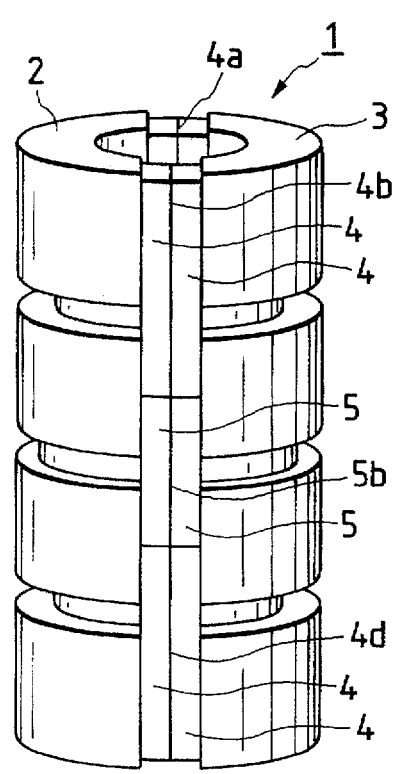

The elastic members 2, 3 are provided on the curved external periphery thereof, with three grooves, which constitute smaller diameter portions or constricted portions 1a, 1b and 1c in the cylindrical vibration element 1 in the assembled state, as shown in FIGS. 1, 2A and 2B. Consequently, the vibration element 1 has three smaller diameter portions 1a, 1b, 1c and four larger diameter portions 1A, 1B, 1C, 1D divided by such smaller diameter portions. The above-mentioned three grooves are provided in positions corresponding to the nodes of torsional and longitudinal vibrations to be explained later. In the present embodiment, the smaller diameter portion 1b is positioned at the axial center of the vibration element 1, while the smaller diameter portions 1a, 1c are positioned symmetrically with respect to the smaller diameter portion 1b. The grooves constituting the smaller diameter portions 1a to 1c can be easily and securely formed on the elastic members 2, 3 by mechanical working such as grinding.

Though the smaller diameter portions 1a to 1c in the present embodiment are formed as stepped constrictions, the vibration element 1 of the ultrasonic actuator of the present invention is not limited to such form but may assume any form as long as the cross section perpendicular to the axis varies along the axis of the vibration element.

The larger diameter portions 1A to 1D are respectively provided with bolt holes 1A' to 1D', in a direction perpendicular to the central axis of the vibration element 1.

The elastic members 2, 3 are fixed in the following manner. At first the elastic members 2, 3 are so maintained as to sandwich the piezoelectric elements 4, 5 between the flat faces, and the shaft 7 is inserted into the center. Then the bolt holes 7b to 7e provided on the shaft 7 are matched with the bolt holes 1A' to 1D', and bolts 13a to 13d are inserted therein. Subsequently nuts 14a to 14d are respectively screwed onto the bolts 13a to 13d thereby fixing the elastic members 2, 3. Firmer fixation can be achieved by applying adhesive material between the elastic members 2, 3 and the piezoelectric elements 4, 5 prior to tightening with the bolts 13a to 13d and the nuts 14a to 14d.

A gap is formed between the vibration element 1 (elastic members 2, 3) and the shaft 7, in order not to hinder the vibrations generated in the vibration element 1 by the shaft 7. Also gaps are formed between the bolts 13a to 13d and the shaft 7 in such a manner that the bolts 13a to 13d, vibrating with the vibration element 1, are not in contact with the shaft 7.

The vibration element 1 is fixed to and supported by a pin 12, penetrating through a pin hole 1E formed in the smaller diameter portion 1b.

The rotor 6, constituting the relative movement member, is composed of a rotor body 6a formed in the form of a thick-walled cylinder, and an annular sliding member 6b which is adhered to an end face of the rotor body 6a, facing the vibration element 1. The rotor body 6a is desirably composed of a metal such as aluminum alloy or stainless steel, or a resinous material. The sliding member 6b is provided for reducing the sliding resistance between the rotor 6 and the vibration element 1. The sliding member 6b can be composed of a resinous material containing PPS (polyphenylene sulfide) or PTFE (polytetrafluoroethylene). In the present embodiment the sliding member 6b constitutes a part of the rotor 6, but it may also be adhered on an end face of the vibration element 1 contacting the rotor 6.

The rotor body 6a is provided with a circular groove 6c on the internal circumference of an end face opposite to the vibration element 1, and the rotor 6 is rotatably supported by the shaft 7, by means of a bearing 8 fitted in the groove 6c.

Also on a face of the rotor 6 opposite to the sliding face thereof, a pressurizing member 11 and belleville springs 9 are fitted on the shaft 7 and tightened with a nut 7f screwed on the screw portion 7a of the shaft 7, thereby pressurizing the rotor 6 to the vibration element 1. The contact pressure between the rotor 6 and the vibration element 1 can be varied by adjusting the tightening of the nut 7f. The belleville springs may be replaced by another member with spring characteristics, such as a coil spring or a plate spring.

FIGS. 2A and 2B are perspective views of the vibration element 1 to be employed in the ultrasonic actuator of the present embodiment. In these drawings, the bolt holes 1A' to 1D' for fixing the semicircular members 2, 3 are omitted for simplicity.

In the present embodiment, as shown in FIGS. 2A and 2B, twelve plate-shaped piezoelectric elements 4, 5, constituting three groups in the axial direction of the vibration elemental, are supported in a sandwiched state between the elastic members 2, 3 constituting the vibration element 1. In each of the groups, the piezoelectric elements are superposed in two layers.

The piezoelectric element 4 constituting the first electromechanical converting element utilizes a piezoelectric constant d15 and generates a torsional vibration in the vibration element 1. The piezoelectric element 5 constituting the second electromechanical converting element utilizes a piezoelectric constant d31 and generates a longitudinal vibration in the vibration element 1. There are provided eight piezoelectric elements 4 in total, of which four are positioned in two sets of two layers in the upper part of the vibration element 1 and the remaining four are positioned in the lower part in a similar manner, while four piezoelectric elements 5 are provided in two sets of two layers at the center of the vibration element 1.

In the piezoelectric elements 4, electrodes 4a, 4b, 4c, 4d are positioned between the superposed layers. Also in the piezoelectric elements 5, electrodes 5a, 5b are positioned between the superposed layers. These electrodes 4a, 4b, 4c, 4d, 5a, 5b are formed by metal plates such as of stainless steel, copper or phosphor bronze, and are fixed in position by adhesion to the piezoelectric elements 4, 5 or by tightening with the bolts 13a to 13d and 14a to 14d. The semicircular members 2, 3 are grounded.

FIG. 3A is a lateral view of the vibration element to be employed in the ultrasonic actuator of the present embodiment, and FIGS. 3B to 3D are cross-sectional views respectively along lines 3B—3B, 3C—3C and 3D—3D in FIG. 3A, showing the arrangement of the piezoelectric elements in the ultrasonic actuator of the present embodiment. Also in FIG. 3A, the bolt holes 1A' to 1D' are omitted as in FIGS. 2A and 2B.

FIGS. 3B, 3C and 3D illustrate the polarizing directions of the piezoelectric elements 4 for the torsional vibration and the piezoelectric elements 5 for the longitudinal vibration. The piezoelectric elements 4 for the torsional vibration are polarized in the axial direction of the vibration element 1, while the piezoelectric elements 5 for the longitudinal vibration are polarized in the transverse direction of the piezoelectric elements.

FIGS. 4A, 4B, 5A and 5B are schematic views showing polarizing direction, electrode arrangement and deformation under voltage application, in the piezoelectric elements 4 for the torsional vibration and those 5 for the longitudinal vibration in the ultrasonic actuator of the present embodiment.

Figure 4A:
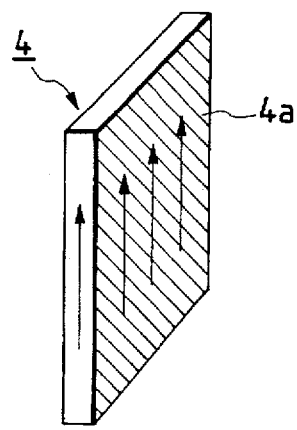
FIG. 4A is a schematic view showing the polarizing direction and the electrode arrangement in a piezoelectric element for the torsional vibration, to be employed in the ultrasonic actuator of the first embodiment.
Figure 4B:
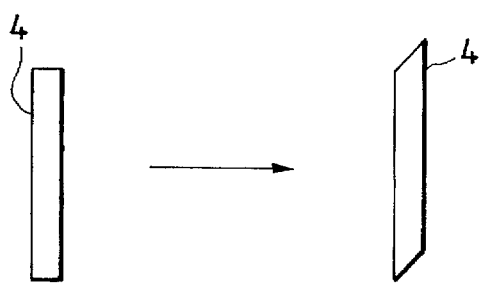
FIG. 4B is a schematic view showing the deformation, under voltage application, of the piezoelectric element for the torsional vibration, to be employed in the ultrasonic actuator of the first embodiment.

The piezoelectric element 4 for the torsional vibration is polarized, as shown in FIG. 4A, in the longitudinal direction of the plate-shaped element and along the longitudinal direction of the vibration element 1. A voltage application by an electrode 4a shown in FIG. 4A generates an electric field in the transversal direction of the piezoelectric element 4, whereby generated is a shearing deformation in the longitudinal direction as shown in FIG. 4B. The two sets of piezoelectric elements 4 in the cross section 3B—3B in FIG. 3B and the two sets of piezoelectric elements 4 in the cross section 3D—3D in FIG. 3D are so arranged that the neighboring piezoelectric elements have mutually opposite polarizing directions. Also referring to FIGS. 3A to 3D, the piezoelectric elements are so arranged that the set at the right and the set at the left have mutually opposite directions of shearing deformation. Furthermore, they are so arranged that the torsions generated in the cross sections 3B—3B and 3D—3D have mutually opposite directions. The shearing deformations in the piezoelectric elements arranged in the above-explained manner generates a second-order torsional displacement with two nodes in the vibration element 1, and such torsional displacement can be utilized for generating a second-order torsional vibration (T2 mode) in the vibration element 1.

Figure 5A:
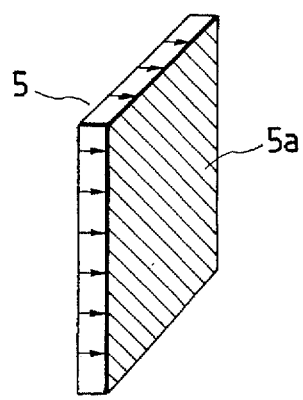
FIG. 5A is a schematic view showing the polarizing direction and the electrode arrangement in a piezoelectric element for the longitudinal vibration, to be employed in the ultrasonic actuator of the first embodiment.
Figure 5B:
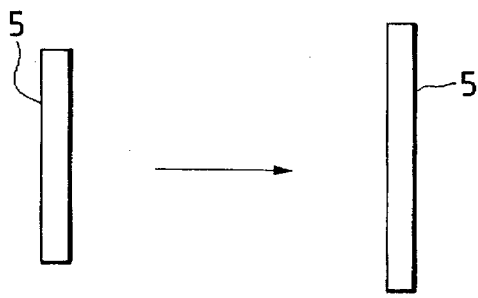
FIG. 5B is a schematic view showing the deformation, under voltage application, of the piezoelectric element for the longitudinal vibration, to be employed in the ultrasonic actuator of the first embodiment.

On the other hand, the piezoelectric element 5 for the longitudinal vibration is polarized in the transverse direction as shown in FIG. 5A. Also as shown in FIG. 3B, the piezoelectric elements 5 for the longitudinal vibration are so arranged that the neighboring elements have mutually opposite polarizing directions. A voltage application by an electrode 5a shown in FIG. 5A generates an electric field in the transverse direction of the piezoelectric element 5, whereby generated is an elongating deformation as shown in FIG. 5B. The piezoelectric elements 5 are so arranged that the direction of the elongating deformation is parallel to the axial direction of the vibration element 1. Also the two sets of piezoelectric elements 5 in the cross section 3C—3C in FIG. 3C are so arranged that they show the elongating or contracting deformation in a same direction under the application of a certain potential. Such elongating or contracting deformation of the piezoelectric elements 5 can be utilized to generating a first-order longitudinal vibration (L1 mode) in the vibration element 1.

Figure 7:
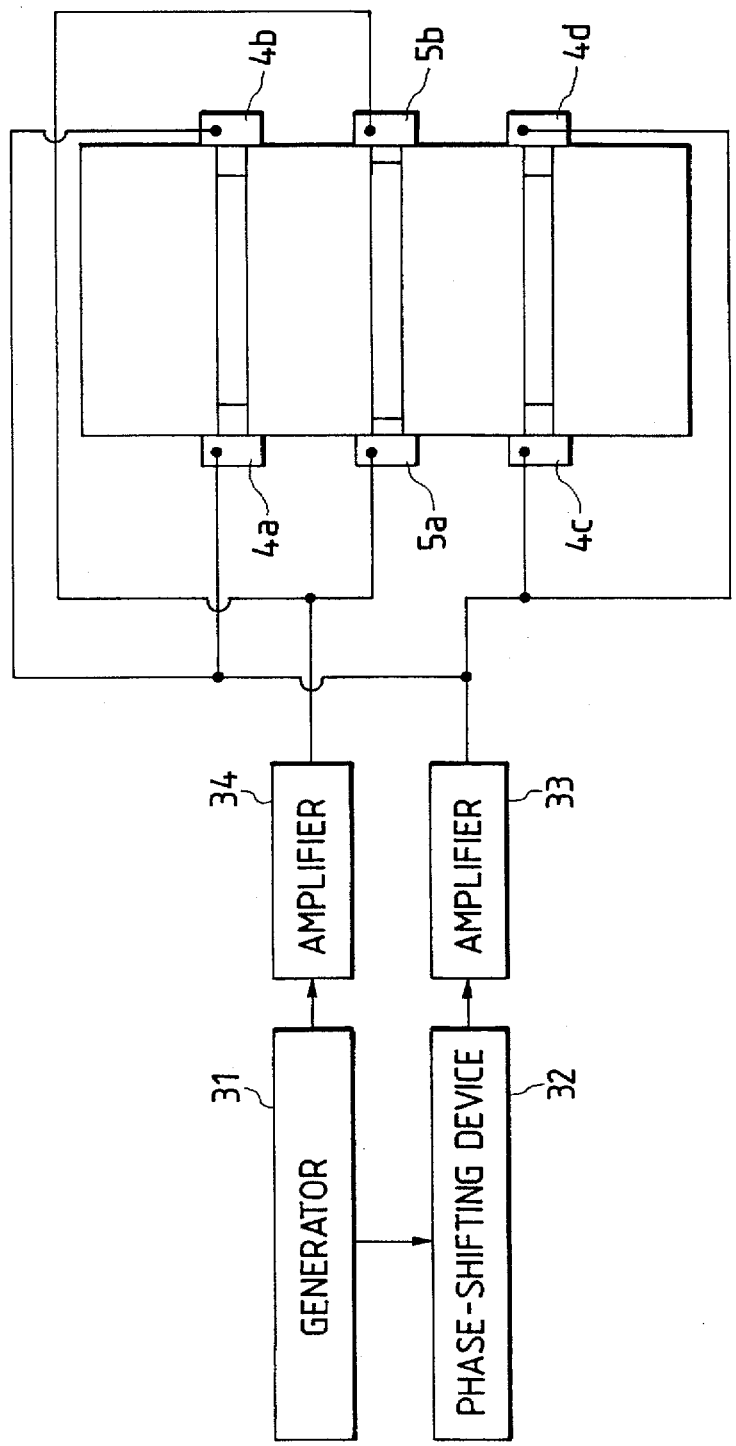
FIG. 7 is a block diagram of a drive circuit for the ultrasonic actuator of the first embodiment.

FIG. 7 is a block diagram of a drive circuit for the ultrasonic actuator of the present embodiment.

A drive signal generator 31 generates a drive signal of a predetermined frequency, which is firstly supplied to an amplifier 33 through a phase shifter 32 for advancing (or delaying) the phase by 90° also supplied directly to an amplifier 34.

The amplifier 33, connected to the electrodes 4a to 4d, amplifies the entered drive signal and sends it to the piezoelectric elements 4. The amplifier 34, connected to the electrodes 5a and 5b, amplifies the entered drive signal and sends it to the piezoelectric elements 5. The torque, revolution and efficiency of the ultrasonic actuator 10 can be improved by selecting the amount of phase shift in the phase shifter 32 at an optimum value.

Application of a sinusoidal voltage drive signal to the piezoelectric elements 4 by such drive circuit generates a second-order torsional vibration in the vibration element 1. Also application of a sinusoidal voltage drive signal to the piezoelectric elements 5 by the drive circuit generates a first-order longitudinal vibration in the vibration element 1. As the phase of the drive signal supplied to the piezoelectric elements 4 is different by 90° (¼ cycle) from that of the drive signal supplied to the piezoelectric elements 5, an elliptical displacement is generated on a driving face S of the vibration element 1.

Figure 6:
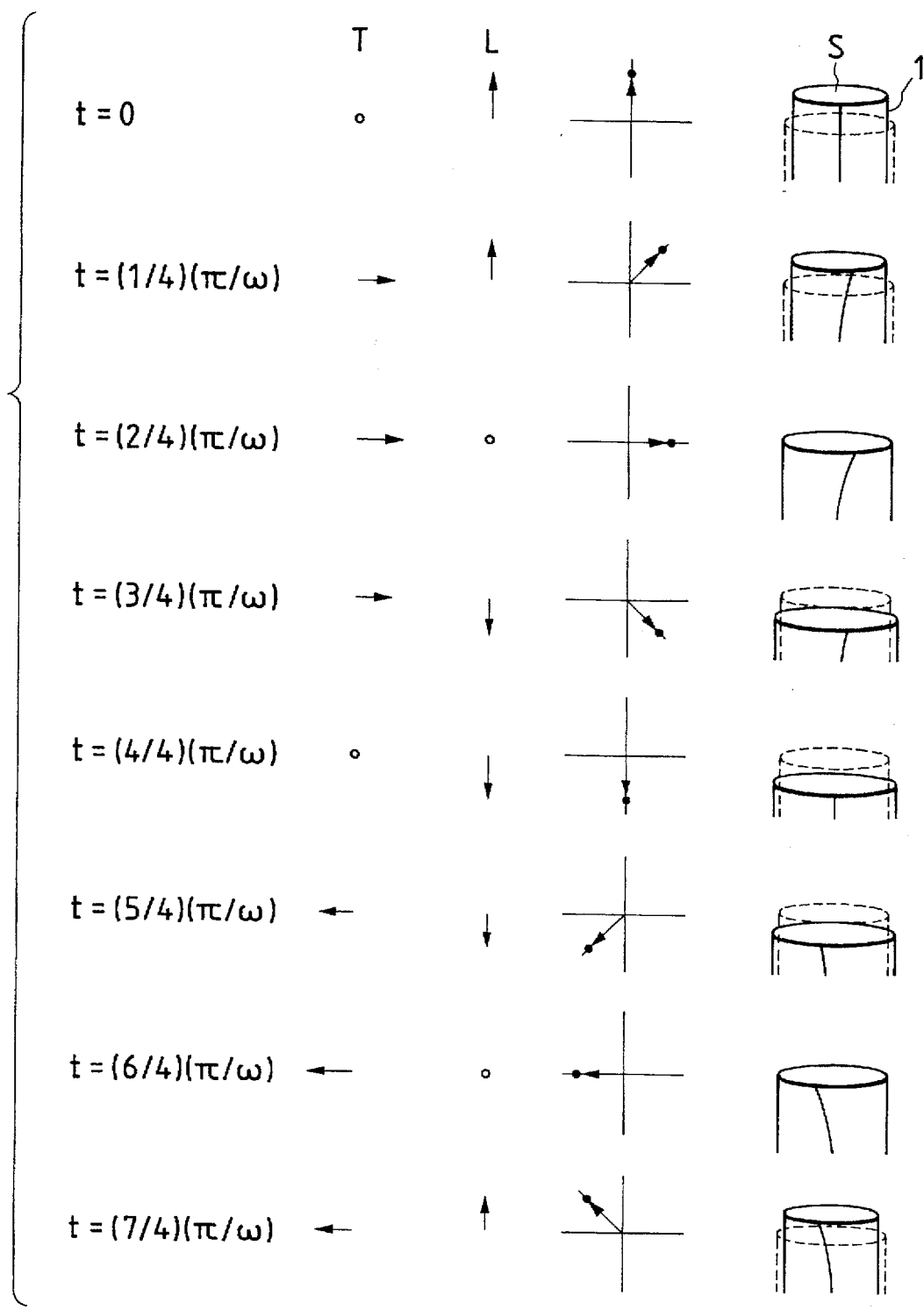
FIG. 6 is a view showing generation of an elliptical motion in time, on the driving face at the end of the vibration element, by the combination of longitudinal and torsional vibrations generated in the vibration element of the first embodiment.

A FIG. 6 includes schematic views showing the principle of driving, in time, of the ultrasonic actuator which generates an elliptical movement of the driving face S through the combination of the first-order longitudinal vibration and the second-order torsional vibration generated in the vibration element 1. In FIG. 6, the rotor 6 maintained in pressure contact with the driving face S is omitted from the illustration for the purpose of simplicity.

A driving frequency f is assumed to correspond to an angular frequency $\omega = (2\pi f)$. At a time $t=(\%)\cdot(\pi/\omega)$, the displacement of the torsional vibration T is at a maximum at the left, while the displacement of the longitudinal vibration L is zero. In this state the movable member is maintained in pressure contact, by means of an unrepresented pressurizing member, with the driving face S of the vibration element 1.

Then, in a period from $t=(7/4)\cdot(\pi/\omega)$ through $t=0$ to $t=(2/4)\cdot(\pi/\omega)$, the torsional vibration T varies from the maximum at the left to the maximum at the right, while the longitudinal vibration L varies from zero to the maximum at the top and returns to zero. Consequently a fixed point on the driving face S of the vibration element 1 rotates to the right, while pushing the unrepresented rotor 6, which is thus driven.

Then, in a period from $t=(\frac{2}{4})\cdot(\pi/\omega)$ to $t=(\frac{3}{4})\cdot(\pi/\omega)$, the torsional vibration T varies from the maximum at the right to the maximum at the left, while the longitudinal vibration L varies from zero to the maximum at the bottom side and returns to zero. Consequently the fixed point on the driving face S of the vibration elemental rotates to the left while it is separated from the rotor, so that the rotor is not driven. Though being pressurized by the pressing member, the rotor does not follow the contraction of the vibration element 1 because of the significant difference in the natural frequency therebetween.

Figure 8:
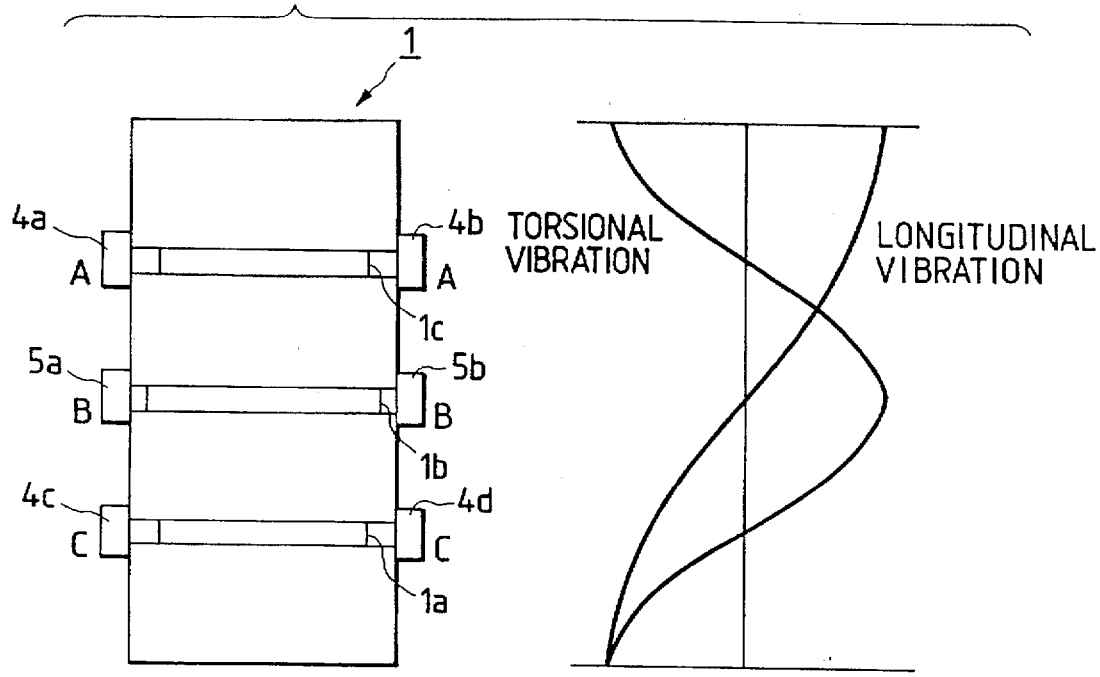
FIG. 8 is a view showing an example of vibration modes of the longitudinal and torsional vibrations generated in the vibration element of the first embodiment.

FIG. 8 is a view showing an example of the vibration modes of the longitudinal and torsional vibrations generated in the vibration element 1 of the ultrasonic actuator of the present embodiment.

In the present embodiment, the driving force is obtained by generating a second-order torsional vibration (T2 mode) and a first-order longitudinal vibration (L1 mode) in the vibration element 1. Therefore, for efficiently driving the ultrasonic actuator, it is desirable to so design the actuator that the torsional and longitudinal vibrations have approximately the same resonance frequencies, thereby increasing the amplitudes of the rotational displacement and the axial displacement. For obtaining such resonance frequencies, the vibration element 1 of the present embodiment is provided with smaller diameter portions (constricted parts) 1a to 1c.

Such smaller diameter portions (constricted parts) 1a to 1c are provided in three positions in total, corresponding to the nodes (in two positions toward the ends in the longitudinal direction of the vibration element 1) of the torsional vibration and the node (at approximate center in the longitudinal direction of the vibration element 1) of the longitudinal vibration, generated in the vibration element 1. The rigidity of the vibration member 1 in the first-order longitudinal vibration is lowered for example by an increase in the depth of the smaller diameter portion 1b, provided at the node of such longitudinal vibration, or by an increase in the width thereof, whereby the resonance frequency of such first-order longitudinal vibration can be lowered. The smaller diameter portion 1b, being positioned at the antinode of the second-order torsional vibration, does not affect significantly the resonance frequency thereof. Similarly the resonance frequency of the second-order torsional vibration can be varied by a change in the shape of the smaller diameter portions 1a, 1c provided at the nodes of such torsional vibration.

As explained in the foregoing, the present embodiment allows for varying the resonance frequency of the longitudinal vibration by varying the shape of the smaller diameter portion 1b. Consequently the longitudinal vibration and the torsional vibration can have approximately the same resonance frequencies by the adjustment of the shape of the smaller diameter portion 1b, and large amplitudes in the longitudinal and torsional vibrations can be obtained with a limited input.

An increase in the amplitude of the first-order longitudinal vibration allows for increasing the pressure of the rotor 6, thereby increasing the torque of the ultrasonic actuator 10. Also an increase in the amplitude of the second-order torsional vibration allows for increasing the revolution of the rotor 6. As a result, the performance of the ultrasonic actuator 10, including torque, revolution and efficiency, can be improved.

Also the presence of the smaller diameter portions 1b, 1a, 1c lowers the rigidity of the nodes of the longitudinal and torsional vibrations, thereby increasing the amplitudes of such longitudinal and torsional vibrations and thus improving the performance of the ultrasonic actuator 10.

In addition, the performance of the ultrasonic actuator 10 can be further improved by selecting optimum material and shape of the vibration member 1 and the rotor 6, and optimum material, shape and pressure of the sliding member 15.

As explained in the foregoing, the ultrasonic actuator 10 of the present embodiment, employing plate-shaped piezoelectric elements 4, 5 for generating the torsional and longitudinal vibrations, allows from improving the precision in shape of such piezoelectric elements 4, 5 thereby achieving secure transmission of the vibration of the piezoelectric elements 4, 5 to the vibration element 1. Consequently the performance of the ultrasonic actuator 10 can be improved, and the manufacture thereof can be facilitated.

Also the present embodiment, employing thin piezoelectric elements 4 for generating the torsional vibration, allows for reducing the voltage required for obtaining a predetermined electric field.

Also in the present embodiment, the smaller diameter portions 1a to 1c provided on the vibration element 1 reduce the rigidity of the vibration element 1 in the longitudinal vibration and in the torsional vibration, thereby increasing the vibrational displacements. Consequently the ultrasonic actuator 10 can provide a higher torque and a higher revolution.

Also in the present embodiment, the reduction in the rigidity of the vibration element 1 in the longitudinal vibration and in the torsional vibration allows for reducing the resonance frequencies of such longitudinal and torsional vibrations, thereby improving the efficiency of the ultrasonic actuator 10.

Furthermore, in the present embodiment, as the smaller diameter portions 1a to 1c provided on the vibration element 1 are independently positioned on the node of the longitudinal vibration and the nodes of the torsional vibration, such vibrations can be given approximately the same resonance frequencies by the adjustment in the diameters of such smaller diameter portions 1a to 1c.

The present embodiment can realize an ultrasonic actuator of a high torque and a high revolution, as the presence of the smaller diameter portions 1a to 1c on the vibration element 1 allows the longitudinal and torsional vibrations to have approximately the same resonance frequencies and to increase the amplitudes thereof.

The conventional vibration actuator has been associated with a drawback that the electromechanical converting element or the elastic member generates heat during the driving because of the dielectric loss or the internal friction caused by vibrations, thereby causing a change in the resonance characteristics of the vibration element. In the present embodiment, the presence of the smaller diameter portions increases the surface area of the vibration element, thereby improving heat dissipation and suppressing the rise in temperature. Such effects can be enhanced by positioning the smaller diameter portions in the vicinity of the nodes or the electromechanical converting elements that tend to generate heat.

Furthermore, the ultrasonic actuator of the present embodiment enables easy fine tuning of the resonance frequencies of the longitudinal and torsional vibrations, after the assembly of the actuator.

More specifically, the ultrasonic actuator 10 of the present embodiment is designed to so position the smaller diameter portions that the longitudinal and torsional vibrations have approximately the same resonance frequencies after the assembling, but such resonance frequencies may not coincide mutually for example because of a tolerance of mechanical working in the manufacture. In such case the resonance frequencies of the longitudinal and torsional vibrations can be adjusted to the same or nearly the same value, by the following methods:

1) by replacing the bolts 13a to 13d with other bolts 13a' to 13d' of a different head length or a different material (thus having a different weight). Replacement of the inner bolts 13b, 13c is preferred in order to maintain the strength of the vibration element 1;

2) by inserting washers on the bolts 13a to 13d;

3) by varying not only the diameter of the smaller diameter portions 1a to 1c of the vibration element 1 but also the diameter of the larger diameter portions 1A to 1D thereof and the axial length thereof, for example by grinding.

The resonance frequencies of the longitudinal and torsional vibrations can be adjusted to the same or approximately the same value by these methods, since the rate of variation of the resonance frequency of the first-order longitudinal vibration is different from that of the second-order torsional vibration. The margin of adjustment of the resonance frequency by such turning is preferably limited for example to 10 Hz, in consideration of the amount of such tuning work.

[Second embodiment]

Figure 9:
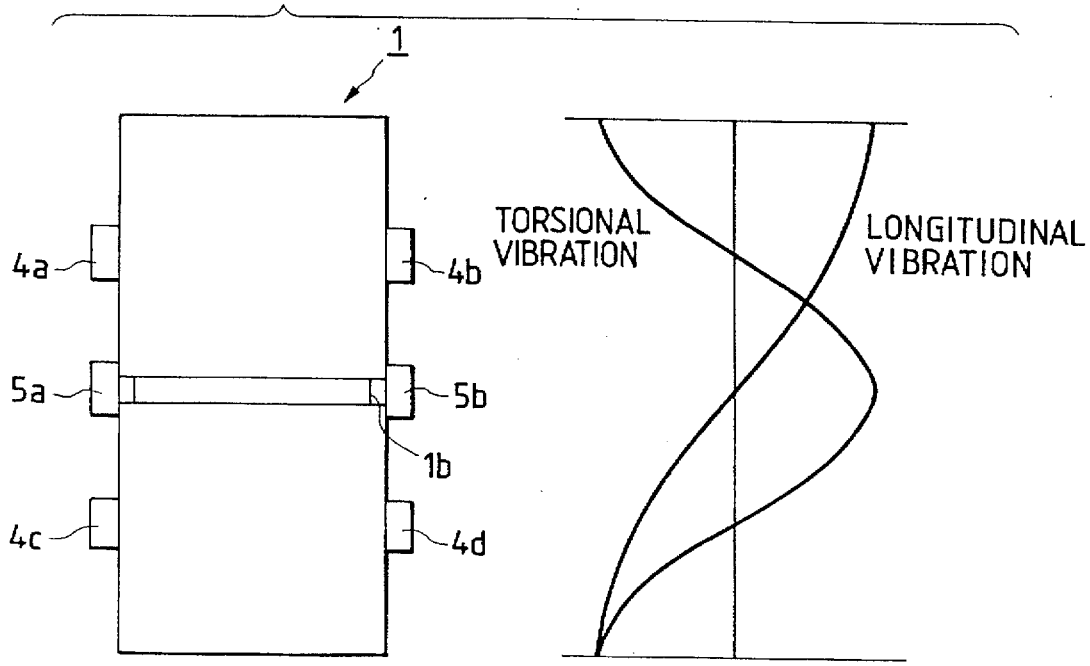
FIG. 9 is a view showing a second embodiment of the vibration actuator of the present invention.

FIG. 9 is a schematic view of a second embodiment of the ultrasonic actuator the present invention. In the following description, there will only be explained parts different from the first embodiment, and the parts same as those in the first embodiment are represented by same numbers and will not be explained further.

In the first embodiment, there has been explained the ultrasonic actuator 10 utilizing the vibration element 1 having three smaller diameter portions 1a to 1c, but the number of such smaller diameter portions is not limited to three, but can be one or two or more.

For example, the vibration element 1 can be provided, as shown in FIG. 9, with only one smaller diameter portion 1b at the node of the first-order longitudinal vibration generated therein, thereby varying the resonance frequency of such vibration. In this manner the first-order longitudinal vibration and the second-order torsional vibration can be given approximately the same resonance frequencies.

[Third embodiment]

Figure 10:
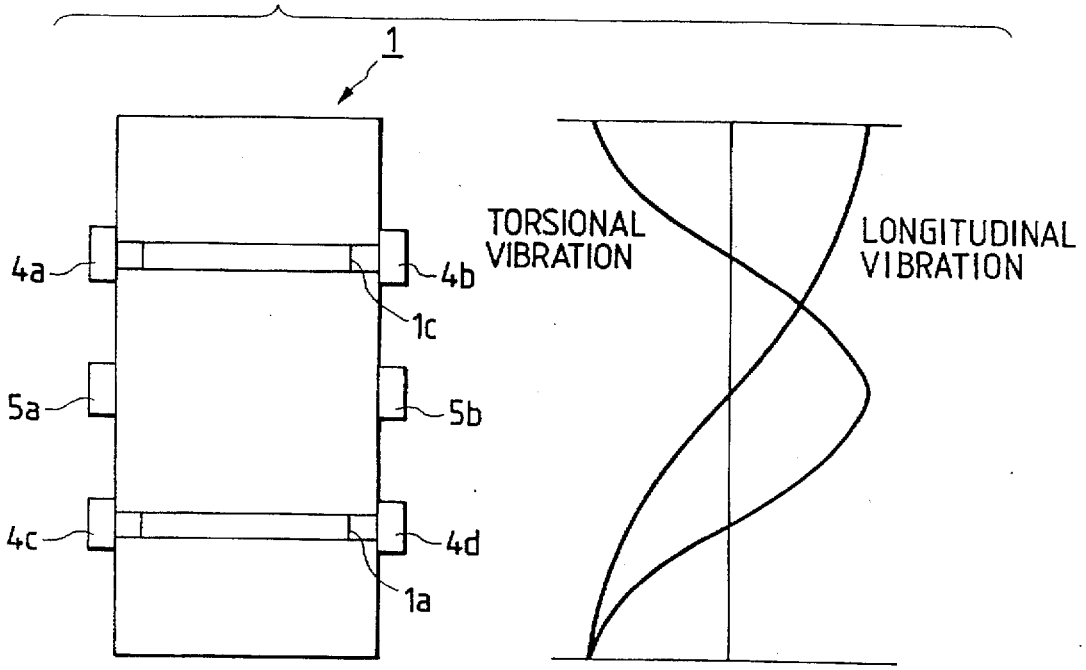
FIG. 10 is a view showing a third embodiment of the vibration actuator of the present invention.

FIG. 10 is a schematic view showing a third embodiment of the ultrasonic actuator of the present invention, wherein the vibration element 1 is provided, as shown in FIG. 10, with two smaller diameter portions 1a, 1c at the nodes of the second-order torsional vibration, thereby varying the resonance frequency thereof. In this manner the first-order longitudinal vibration and the second-order torsional vibration can be given approximately same resonance frequencies.

[Fourth embodiment]

The first embodiment provides an ultrasonic actuator utilizing composite vibrations of the first-order longitudinal vibration and the second-order torsional vibration, but the same effects can be attained by a combination of other vibration modes.

Figure 11:
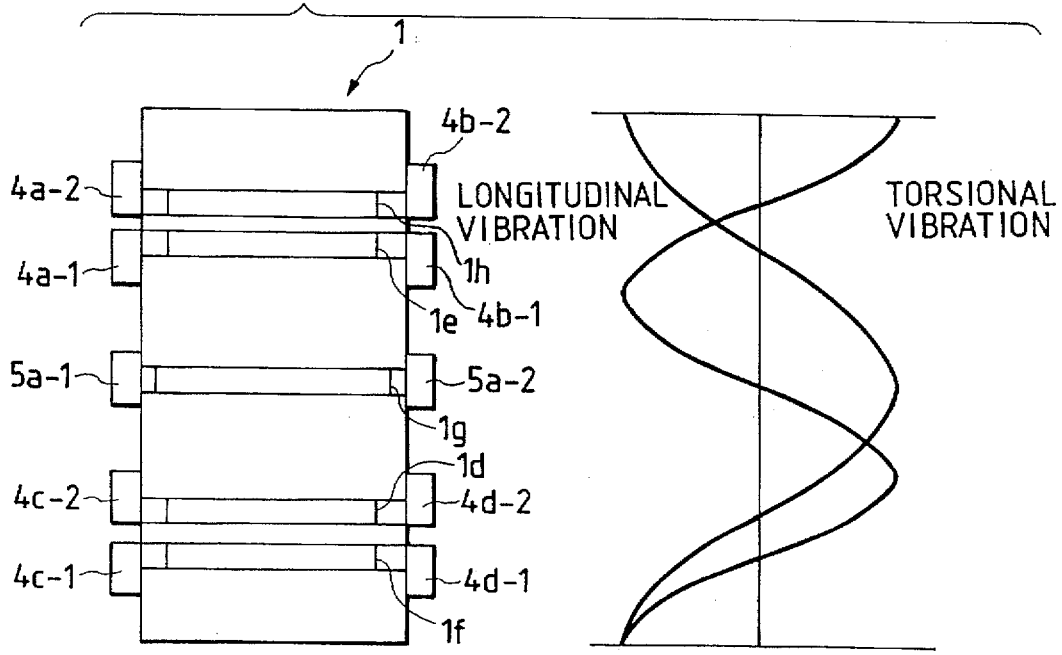
FIG. 11 is a view showing a fourth embodiment of the vibration actuator of the present invention.

FIG. 11 shows the relationship between the vibration modes of a vibration element 1 utilizing composite vibrations of a second-order longitudinal vibration and a third-order torsional vibration, and the positions of the smaller diameter portions to be formed on the vibration element 1.

In the present embodiment, there are provided five smaller diameter portions in total, consisting of two smaller diameter portions 1d, 1e at the nodes of the second-order longitudinal vibration and three smaller diameter portions 1f, 1g, 1h at the nodes of the third-order torsional vibration.

In FIG. 11, there are provided electrodes 4a-1, 4a-2, 4b-1, 4b-2, 4c-1, 4c-2, 4d-1, 4d-2, 5a-1 and 5a2.

Also in this embodiment, the resonance frequencies of the longitudinal and torsional vibrations can be made approximately the same, by varying the shape of the five smaller diameter portions 1d to 1h.

[Fifth embodiment]

Figure 12:
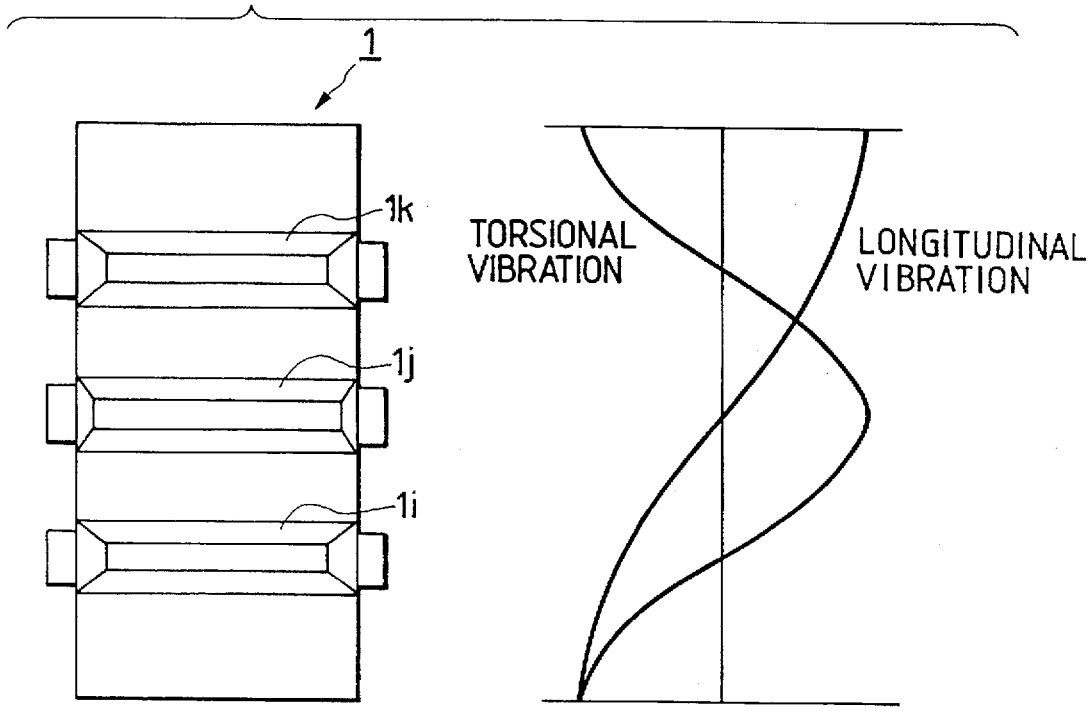
FIG. 12 is a view showing a fifth embodiment of the vibration actuator of the present invention.

In the first to fourth embodiments, the smaller diameter portions are formed in a stepped shape on the external surface of the vibration element 1, but such stepped shape is not essential. The resonance frequencies of the longitudinal and torsional vibrations can be made approximately the same also by employing, for example as shown in FIG. 12, smaller diameter portions 1i to 1k of a shape having continuously varying cross section.

[Sixth embodiment]

Figure 14:
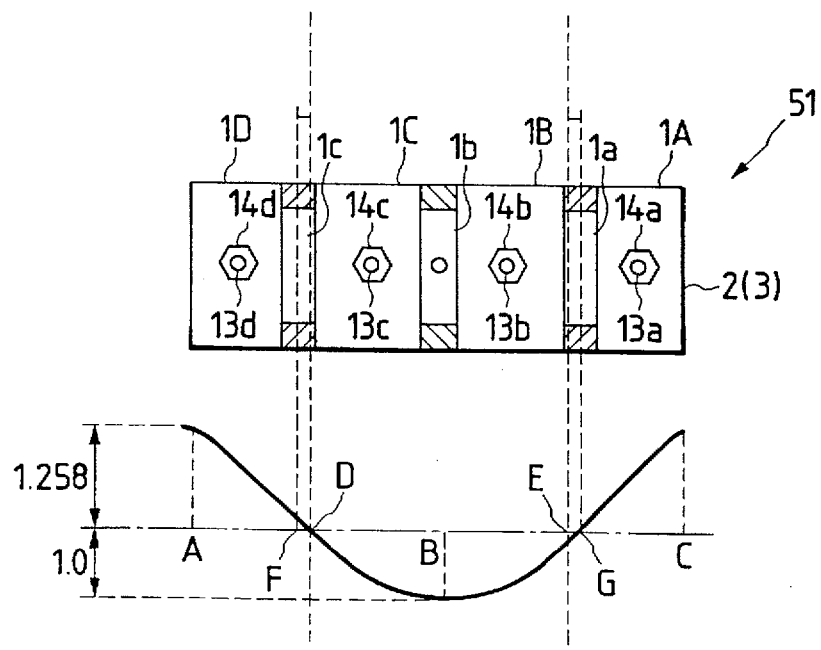
FIG. 14 is a plan view showing the configuration of the vibration element in FIGS. 13A and 13B.
Figure 13A:
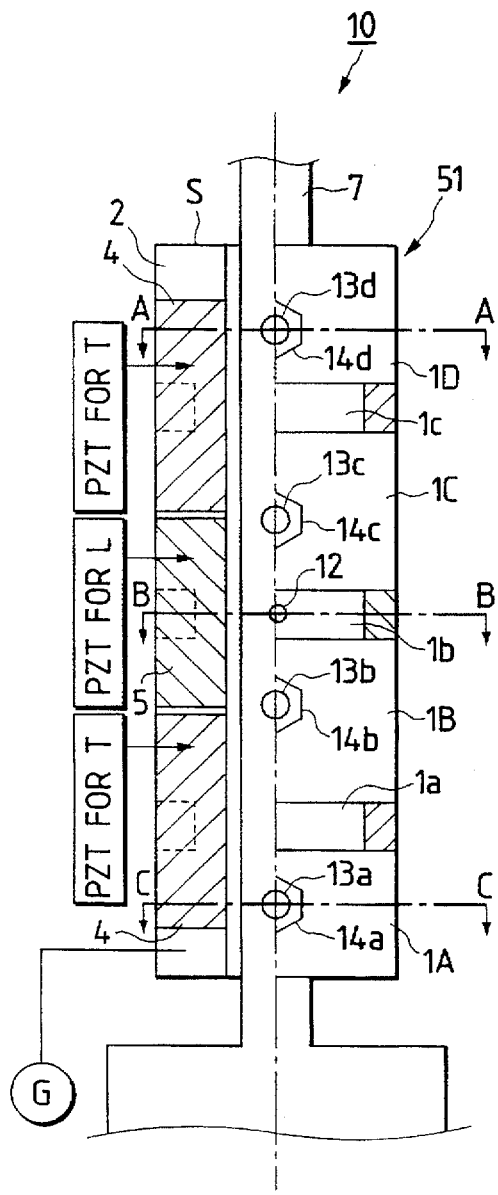
Figure 13B:
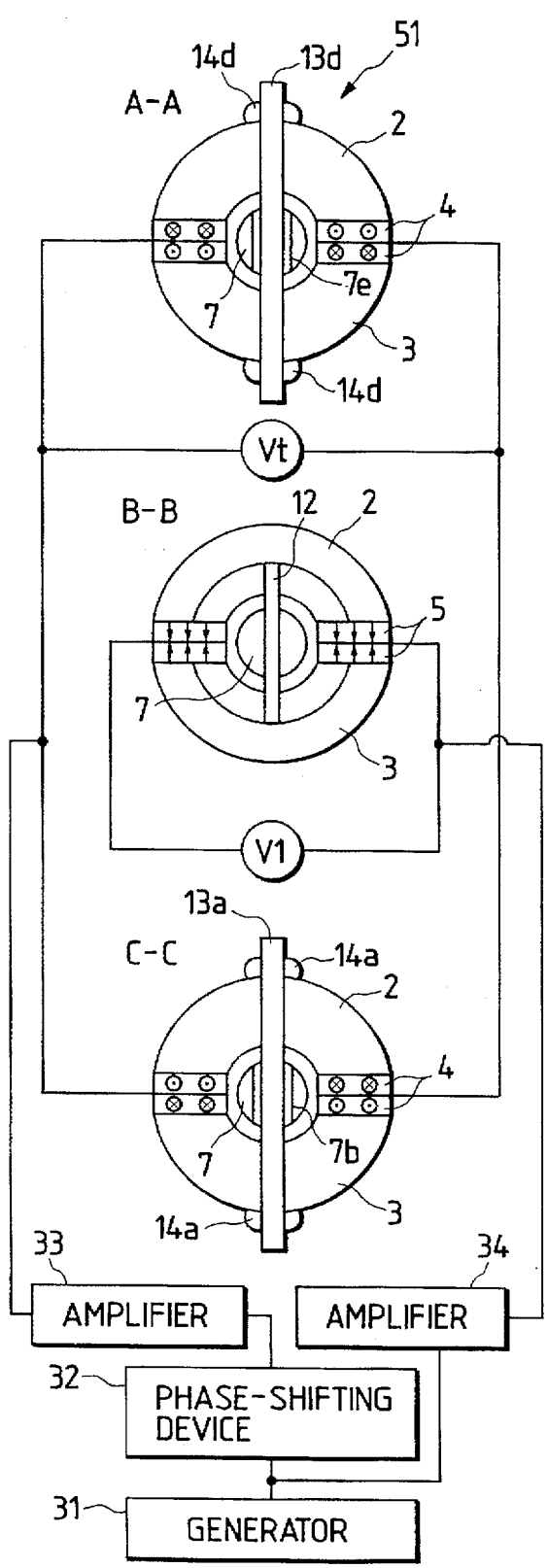

FIGS. 13A and 13B are views showing the structure of the vibration element 51 in a sixth embodiment of the ultrasonic actuator. FIG. 13A is a lateral view showing the left-hand half in cross section, while FIG. 13B is a view showing the cross sections along lines A—A, B—B and C—C in FIG. 13A, together with the state of drive signal application. Also FIG. 14 is a plan view of the vibration element 51 shown in FIG. 13A.

In the vibration element 51 of the ultrasonic actuator 10 shown in FIG. 13A, the smaller diameter portions 1a, 1c are respectively displaced, in comparison with those in the vibration element 1 of the first embodiment, toward the ends of the vibration element 51, by a distance of about 3% of the entire length thereof. Therefore, the axial dimension of the larger diameter portions 1A, 1D is smaller than that of the larger diameter portions 1B, 1C.

Figure 15:
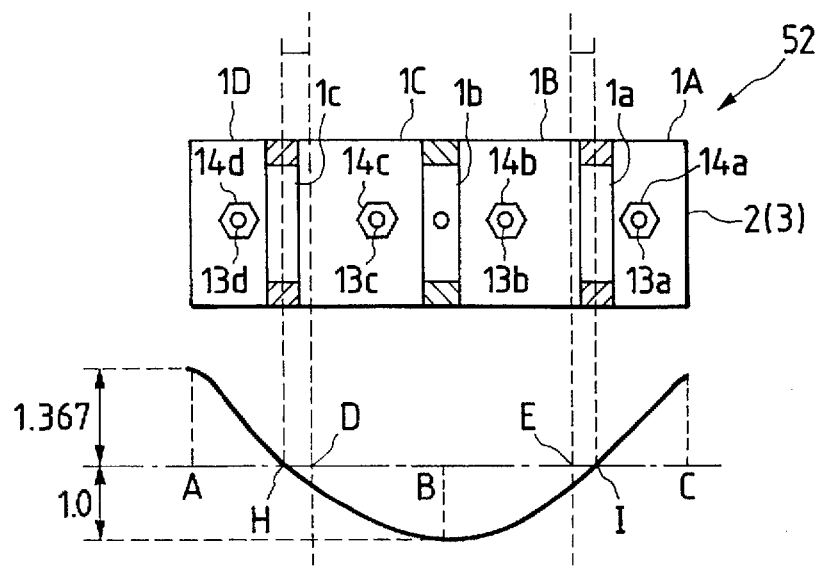
FIG. 15 is a plan view showing another configuration of the vibration element of the sixth embodiment.

FIG. 15 is a plan view of a vibration element 52, to be employed in another ultrasonic actuator of the sixth embodiment. The vibration element 52 is same as the vibration element 51 shown in FIG. 14, except that the smaller diameter portions 1a, 1c are respectively displaced, in comparison with those in the vibration element 1 of the first embodiment, toward the ends of the vibration element 51, by a distance of about 6% of the entire length thereof. The vibration element 51 shown in FIG. 14 and the vibration element 52 shown in FIG. 15 are different from that of the first embodiment only in the position of the smaller diameter portions. Consequently the explanation of the present embodiment will be made only on such difference, and the components that are the same as those in the first embodiment will be represented by same numbers and will not be explained further.

Figure 16:
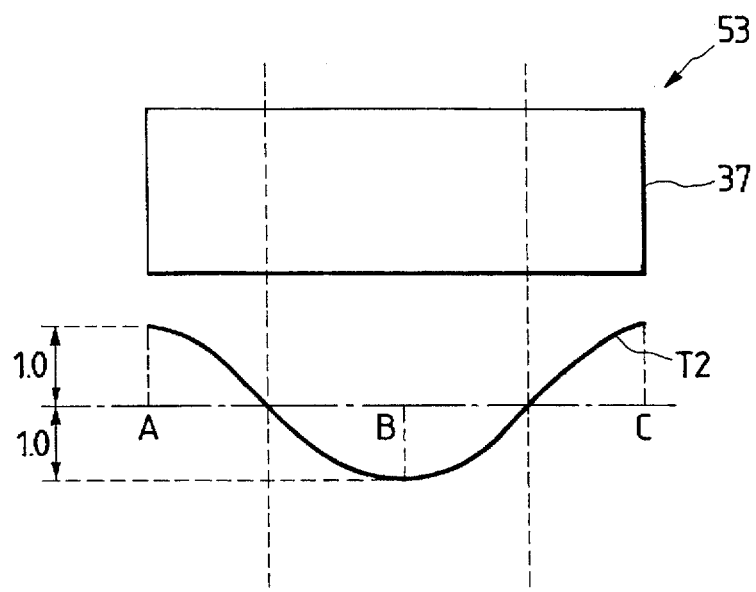
FIG. 16 is a plan view showing a vibration element of a simple external form without the smaller diameter portion.
Figure 17:
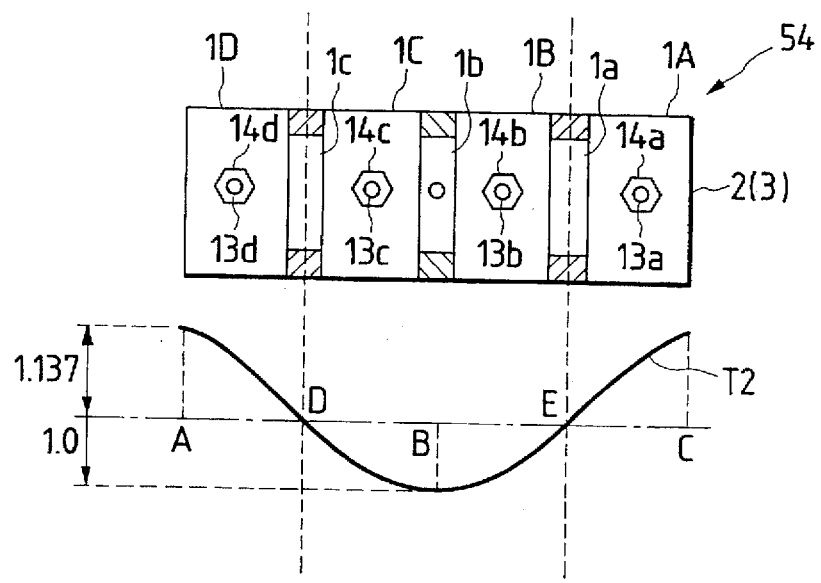
FIG. 17 is a lateral view of a vibration element similar to that in the first embodiment.
Figure 18:
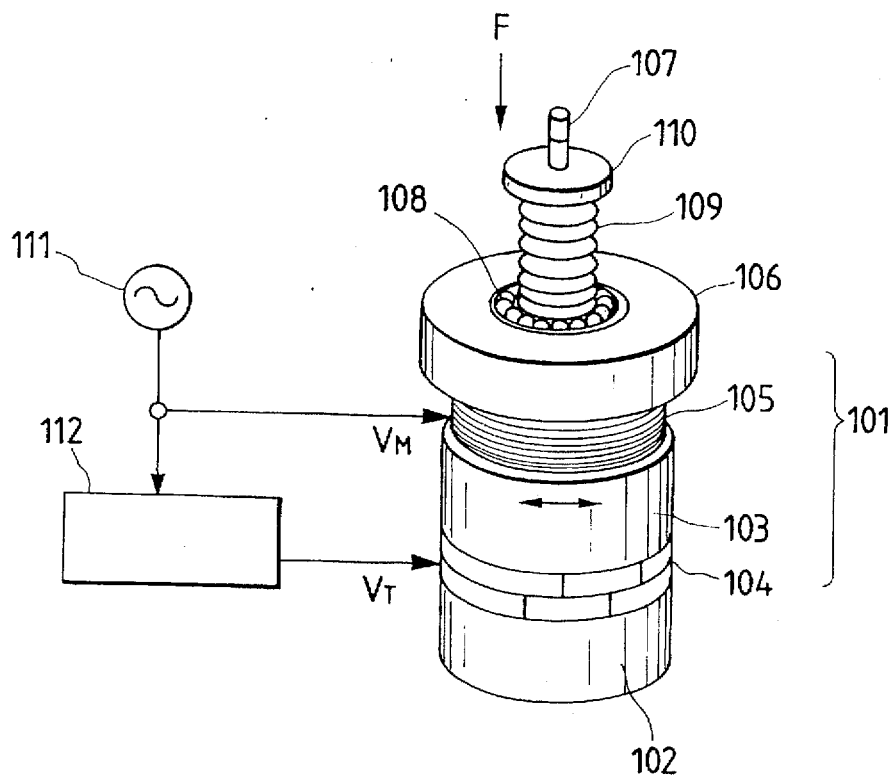
FIG. 18 is a perspective view of a conventional vibration actuator utilizing longitudinal-torsional vibrations.
Figure 19:
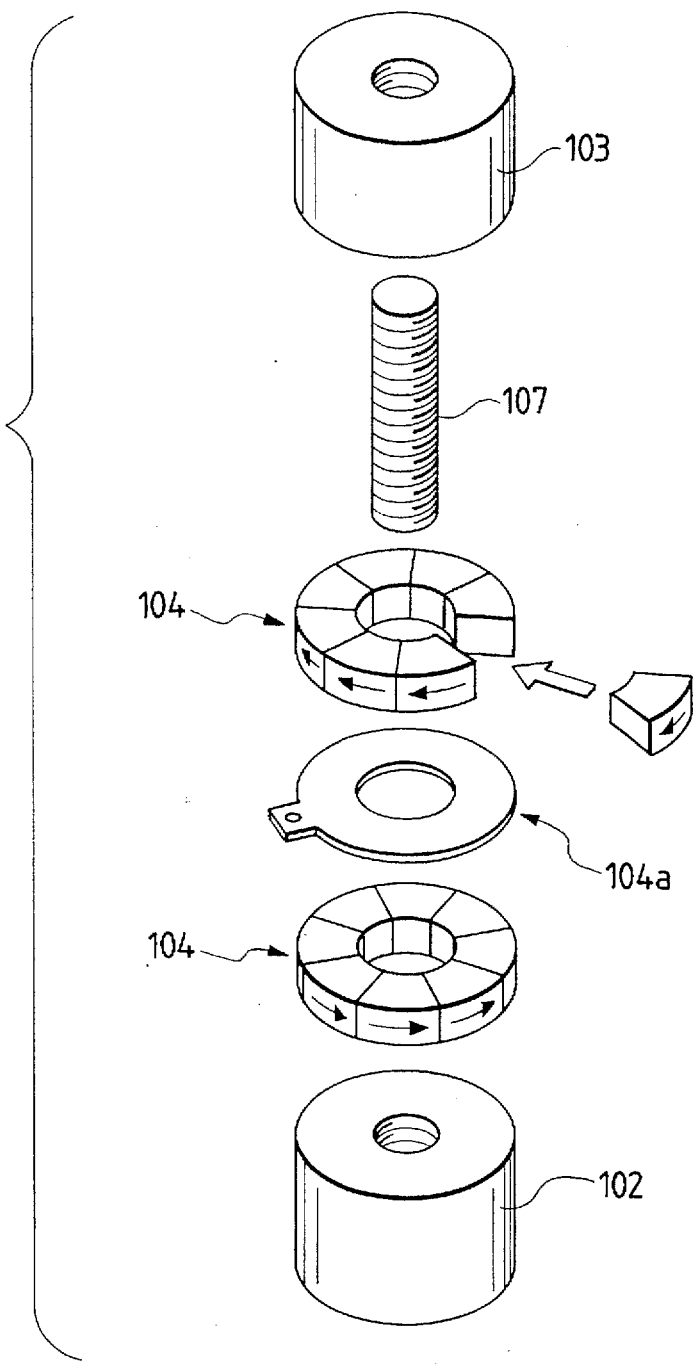
FIG. 19 is an exploded perspective view of a stator of a conventional vibration actuator.

FIG. 16 is a plan view showing a vibration element 53 of a simple external form without the smaller diameter portions, and FIG. 17 is a plan view of a vibration element 54 of a configuration substantially the same as that of the first embodiment.

The following explanation will be made, based on the comparison of the vibration elements 51, 52 of the present embodiment and those 53, 54 shown in FIGS. 16 and 17.

FIG. 16 also shows the amplitude of a second-order torsional vibration (T2 mode) generated in an elastic unit 37 of a simple circular rod shape. In FIG. 16, the left-hand end face A of the elastic unit 37 constitutes the driving face S, through which the driving force is transmitted to the relative movement member (rotor). In FIG. 16 there is shown the amplitude at the left-hand end face (driving face) A, taking the amplitude of an antinode at the center B as "1", among three antinodes generated at the left-hand end face A, the center B and the right-hand end face C.

In the vibration element 53 shown in FIG. 16, since the elastic unit 37 is a simple circular rod without the smaller diameter portions, the second-order torsional vibration generated therein assumes a simple sinusoidal form. Consequently, in the case shown in FIG. 16, the ratio of the amplitude of the antinode at the left-hand end face A or the right-hand end face C to that at the center C becomes equal to 1.

In the vibration element 54 shown in FIG. 17, the elastic unit is provided, on the external surface thereof, with the smaller diameter portions 1a, 1c, for matching the resonance frequency with that of the first-order longitudinal vibration, at the two nodal positions D, E of the second-order torsional vibration shown in FIG. 17. Stated differently, the smaller diameter portions 1a, 1c are positioned at the nodes of the second-order torsional vibration shown in FIG. 16 in case it assumes a simple sinusoidal form. In such case, the ratio of the amplitude of the antinode at the left-hand end face A or the right-hand end face C to that at the center C becomes about 1.137.

As explained above, in the vibration element 54 constructed substantially the same as in the first embodiment, the amplitude of the torsional vibration increases by about 14%, in comparison with that of the vibration element 53 without the smaller diameter portions as shown in FIG. 16, by the formation of such smaller diameter portions in the nodal positions of the torsional vibration.

In the vibration element 51 of the present embodiment shown in FIG. 14, the positions F, G of the smaller diameter portions 1a, 1c are respectively displaced, in comparison with those of the vibration element 54 shown in FIG. 17, toward the end faces of the vibration element 51 by a distance of about 3% of the entire length thereof. In such vibration element 51, as shown in FIG. 14, the ratio of the amplitude of the antinode at the left-hand end face A to that at the center B becomes about 1.258. Thus the amplitude of the torsional vibration increases by about 26% in comparison with that of the vibration element 53 shown in FIG. 16 and by about 11% in comparison with that of the vibration element 54 shown in FIG. 17.

In the vibration element 52 shown in FIG. 15, the positions H, I of the smaller diameter portions 1a, 1c are respectively displaced, in comparison with those of the vibration element 54 shown in FIG. 17, toward the end faces of the vibration element 52 by a distance of about 6% of the entire length thereof. In such vibration element 52, as shown in FIG. 15, the ratio of the amplitude of the antinode at the left-hand end face A to that at the center B becomes about 1.367. Thus the amplitude of the torsional vibration increases by about 37% in comparison with that of the vibration element 53 shown in FIG. 16 and by about 20% in comparison with that of the vibration element 54 shown in FIG. 17.

Such increase in the amplitude in the vibration element 51 or 52 shown in FIG. 14 or 15, in comparison with the vibration element 53 or 54 shown in FIG. 16 or 17, is based on the following principle.

If the vibration element 51, 52, 53 or 1 is converted into a simple spring-mass model, by replacing the antinode with an inertial mass member and the node with a spring, based on the distribution of displacement in the second-order torsional vibration, the shift of the smaller diameter portions 1a, 1c respectively toward the end faces is equivalent to a decrease of the inertial masses at the end and an increase of the inertial masses at the center.

Consequently the left- and right-hand end faces A, C with such reduced masses show an increase in the vibration velocity because of the reduced inertial effect, while the central portion B with an increased inertial effect shows a decrease in the vibrating velocity. As the total mass varies little in the entire vibration element, the resonance frequency varies only little. Consequently the increase or decrease in the vibrating velocity is directly reflected as an increase or decrease of the vibrating amplitude.

Therefore, the present embodiment allows for controlling the balance of amplitudes at the left-hand end face A and the center B, and to increasing the vibrational displacement that can be obtained from the driving face S of the vibration element and influencing the driving performance.

As explained in the foregoing, in the present embodiment, the inertial mass of a first portion (larger diameter portion 1D) containing an antinode positioned at the end face side, among plural portions divided by the nodes of either or both of the two vibrations generated in the elastic member, can be made smaller than the inertial mass of another second portion by a shift of the position of the smaller diameter portion 1c toward the end face (driving face) of the vibration element.

Thus, in the ultrasonic actuator utilizing the vibration element 51 or 52 of the present embodiment, the shape of the vibration generated in the vibration element can be so controlled and modified that the amplitude at an antinode at the driving face S becomes larger than that at another antinode. Consequently the displacement obtainable from the driving face S in a cycle of vibration can be made larger than the displacement in other positions not utilized for driving, and the ultrasonic actuator can therefore provide a higher torque and a higher revolution.

In the sixth embodiment explained above, the position of the smaller diameter portion 1c is shifted toward the end face (driving face), to modify the balance of masses in a spring-mass model representing the vibration element, thereby increasing the amplitude of the antinode generated at the driving face S in comparison with that at another antinode. However, the ultrasonic actuator of the present invention is not limited to such form only.

More specifically, the same effects can also be obtained by the bolts 13a to 13d or nuts 14a to 14d shown in FIGS. 14 and 15. For example the bolts 13a, 13d may be formed with a material of a lower specific gravity or with a shorter head, for reducing the inertial effect in comparison with that of the bolts 13b, 13c, thereby increasing the amplitude of the antinode generated at the driving face S, in comparison with the amplitude of the antinode in another position.

It is also possible to divide the elastic unit into plural portions by the nodal positions of plural vibrations, and to constitute the first portion containing the driving face S with a lighter material (such as aluminum alloy) and to constitute other portions for example with stainless steel.

Furthermore, though the present embodiment has been explained by a case of generating a second-order torsional vibration and a first-order longitudinal vibration in the vibration element, but the present invention is not limited to such case and is equally applicable to an ultrasonic actuator utilizing different degenerate vibration modes, where an m-th order torsional vibration and an n-th order longitudinal vibration are generated in the vibration element (m, n being natural numbers).

Also in the present embodiment, there has been explained the adjustment of the inertial mass for the second-order torsional vibration, in case of the vibration element involving a second-order torsional vibration and a first-order longitudinal vibration, but the present invention is not limited to such case and is likewise applicable to the adjustment for the first-order longitudinal vibration. In such case, the increase in the amplitude of such first-order longitudinal vibration leads to an increase in the torque generated by the ultrasonic actuator.

Also in the foregoing first to sixth embodiments, the elastic unit is assumed to be divided into two along a plane containing the central axis, but the present invention is likewise applicable also to a case where the elastic unit is divided into three or more portions.

Also in the foregoing first to sixth embodiments, the elastic unit is assumed to have a cylindrical external shape, but the present invention is not limited to such case and is likewise applicable for example to an elastic unit with a polygon cross section, such as a square cross section.

Also the foregoing first to sixth embodiments employ piezoelectric elements as the electromechanical converting elements, but the present invention is not limited to such case and can likewise employ any other element that can convert electric energy into mechanical displacement, such as an electrostriction element or a magnetostriction element.

What is claimed is:

1. A vibration actuator comprising a bar-shaped vibration element including an elastic unit having plural elastic members and an electromechanical converting device having portions disposed between mutually adjacent ones of said elastic members in a direction perpendicular to an axis of said vibration element and adapted to generate mutually different plural vibrations by receiving drive signals; and a relative movement member contacting an end face of said vibration element and adapted to effect a movement relative to said vibration element;

wherein said vibration element is so formed that the cross section thereof perpendicular to said axis varies along said axis.

2. A vibration actuator according to claim 1, wherein said plural vibrations include a torsional vibration around the axis of said vibration element and a longitudinal vibration along the axis of said vibration element, and the resonance frequency of the torsional vibration generated in said vibration element is approximately the same as that of the longitudinal vibration generated in said vibration element.

3. A vibration actuator according to claim 2, wherein said vibration element is of a cylindrical shape having a smaller diameter portion in at least one position thereof.

4. A vibration actuator according to claim 3, wherein said longitudinal vibration is a first-order vibration and said torsional vibration is a second-order vibration, and smaller diameter portions of said vibration element are provided in three positions in total, corresponding to a nodal position of said longitudinal vibration and two nodal positions of said torsional vibration.

5. A vibration actuator according to claim 3, wherein said longitudinal vibration is a first-order vibration and said torsional vibration is a second-order vibration, and a smaller diameter portion of said vibration element is provided in a position corresponding to a nodal position of said longitudinal vibration.

6. A vibration actuator according to claim 3, wherein said longitudinal vibration is a first-order vibration and said torsional vibration is a second-order vibration, and smaller diameter portions of said vibration element are provided in two positions corresponding to two nodal positions of said torsional vibration.

7. A vibration actuator according to claim 3, wherein said longitudinal vibration is a second-order vibration and said torsional vibration is a third-order vibration, and smaller diameter portions of said vibration element are provided in five positions in total, corresponding to two nodal positions of said longitudinal vibration and three nodal positions of said torsional vibration.

8. A vibration actuator according to claim 2, wherein said vibration element is so formed that a position of a maximum cross section perpendicular to the axis is different from a nodal position of said longitudinal vibration.

9. A vibration actuator according to claim 2, wherein said vibration element is so formed that a position of a maximum cross section perpendicular to the axis is different from a nodal position of said torsional vibration.

10. A vibration actuator according to claim 1, wherein at least one of said plural vibrations is a first vibration generating plural antinodes and at least a node in said elastic unit; and said vibration element is so formed that the inertial mass of a portion thereof containing the end face in contact with said relative movement member, among plural portions divided by mutually adjacent ones of the antinodes and node or nodes of said first vibration, is smaller than the averaged inertial mass of the remainder of said plural portions.

11. A vibration actuator according to claim 10, wherein said elastic unit is provided with a groove in a direction crossing an axis of said elastic unit, along a periphery of said elastic unit in at least one nodal position of said first vibration.

12. A vibration actuator according to claim 10, wherein said elastic unit is so formed that an elastic material thereof in the portion of said vibration element containing said end face and an elastic material thereof in another portion of said vibration element have mutually different specific gravities.

13. A vibration actuator according to claim 10, wherein said vibration element includes an inertial mass mounted to the portion containing said end face or to another portion of said vibration element.

14. A vibration actuator according to claim 13, wherein said inertial mass is a bolt member mounted on said elastic unit and/or a nut member screwed on said bolt member.

* * * * *